(12) United States Patent
Ogawa et al.

(10) Patent No.: US 7,385,136 B2
(45) Date of Patent: Jun. 10, 2008

(54) HARNESS WIRE COVER AND HARNESS WIRING STRUCTURE HAVING THE SAME

(75) Inventors: Naotaka Ogawa, Shizuoka (JP); Gaku Ito, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 11/645,586

(22) Filed: Dec. 27, 2006

(65) Prior Publication Data
US 2007/0158092 A1      Jul. 12, 2007

(30) Foreign Application Priority Data
Jan. 11, 2006  (JP) .............................. 2006-003320

(51) Int. Cl.
*F16G 13/16* (2006.01)
(52) U.S. Cl. ..................................... 174/19; 59/78.1
(58) Field of Classification Search ............... 174/19; 59/78.1; 248/49
See application file for complete search history.

(56) References Cited
U.S. PATENT DOCUMENTS
2,891,501 A * 6/1959 Rather .................... 114/243

FOREIGN PATENT DOCUMENTS

| JP | 9-326571 | 12/1997 |
|---|---|---|
| JP | 2000-118619 | 4/2000 |
| JP | 2002-542753 | 12/2002 |
| JP | 2003-25850 | 1/2003 |

* cited by examiner

*Primary Examiner*—Chau N Nguyen
(74) *Attorney, Agent, or Firm*—Kratz, Quintos & Hanson, LLP

(57) ABSTRACT

Providing a harness wire cover flexible in 3-dimensional directions, a harness wire cover is structured by connecting a first connecting member and a second connecting member alternatively into one another where the first connecting member and the second connecting member have respectively a first joint for engaging the first and second connecting members rotatably in a circumference direction of the harness wire cover and a second joint for engaging them rotatable in an axial direction of the harness wire cover. The first joint includes one wall of the first connecting member and the other wall of the second connecting member, a first pin, and an oval hole engaged with the first pin. The second joint portion includes one pair of walls of the first connecting member and the other pair of walls of the second connecting member, a second pin, and a hole engaged with the second pin.

5 Claims, 6 Drawing Sheets

HARNESS WIRE COVER AND HARNESS WIRING STRUCTURE HAVING THE SAME

The priority application Number Japan Patent Application 2006-003320 upon which this patent application is based is hereby incorporated by reference.

FIELD OF INVENTION

The present invention relates to a flexible harness wire cover, which a plurality of electric wire is inserted through for protecting from external interference, and a harness wiring structure having the same.

RELATED ARTS

FIG. 7 illustrates an example of a harness wire cover by prior art (reference: patent document 1).

The harness wire cover 60 is formed into a caterpillar-like shape by alternatively connecting a plurality of connecting members 61 so as to be bendable in one direction. Each of the connecting members 61 has a horizontal plate 63 connecting a pair of vertical sidewalls 62 provided at both side of the horizontal plate 63. A hole 64 is arranged at one end of the vertical sidewall 62 and a pin 65 is arranged at the other thereof.

The harness wire cover 60 to be long and flexible is assembled by connecting a plurality of connecting members 61 into the longitudinal direction of the electric wire by engaging the pin 65 of one connecting member 61 into the hole 64 of the other connecting member 61 rotatably through a bearing 66.

The harness wire cover 60 is applied into a machine tool or an assembly machine (refer Patent Document 2). By inserting an electric wire 66 through the harness wire cover 60, and fixing one end of the harness wire cover 60 on a fixed unit (not shown) of the machine tool and the other end on a moving unit (not shown), the harness wire cover 60 follows the movement of the moving unit so as to be bent together with the electric wire 66. Thereby, the contained electric wire 66 in the harness wire cover 60 is protected safely from external interference.

FIG. 8 illustrates an example of a harness wiring structure by prior art (refer Patent Document 3).

A harness wire cover, similar as shown in FIG. 7, is used in the structure. The harness wiring structure is applied to supply electric power constantly from a main body of a motor vehicle to a sliding door 72. A power supply apparatus 71 includes a long-sideways case 73 arranged along the sliding door 72, a slider 74 engaged slidably with a guiding rail (not shown) in the case, a swing member 75 supported pivotably in a horizontal plane by a pivot perpendicular to the slider 74 and a harness wire cover 76 with a caterpillar-like shape provided so as to be formed into a U-shape in the long-sideways case 73, and arranged flexibly between the swing member 75 and the main body of the vehicle.

A tube 77 covers the harness wiring cover 76 at a bridge portion in between the main body of the vehicle and the sliding door 72. A plurality of electric wires 78 is inserted through the harness wire cover 76 and the slider 75.

By opening the slide door 72 in a condition shown in FIG. 8 in a direction indicated by an arrow A, the slider 74 moves relatively forward along the long-sideways case 73. Simultaneously, the harness wire cover 76 and the wire harness 78 extend so as to be formed into a J-shape in the long-sideways case 73. According to an open-close movement of the sliding door 72, the wire harness 78 and the harness wire cover 76 move together so as to absorb slacks of the wire harness.

Another example of a harness wire cover by prior arts is shown in Patent Document 4. The harness wire cover (not shown) is formed by four kinds of connecting members; a first, second, third and fourth connecting members, bendable into at least two directions intersecting perpendicularly to each other.

The first connecting member includes a pair of pins protruding along one direction. The second connecting member includes a pair of pins protruding along the other direction perpendicular to the one direction and a pair of mating holes engaged respectively with the pin of the first connecting member. The third connecting member includes a pair of pins protruding along the other direction and a pair of mating holes engaged respectively with the pin along the other direction of the second connecting member. The forth connecting member includes a pair of pins protruding along the one direction and a pair of mating holes engaged respectively with the pin of the third connecting member.

A plurality of first connecting members is connected to each other so as to be bendable in the other direction. A plurality of third connecting members is connected to the first connecting member through the second connecting member so as to be bendable in the one direction. The third connecting member is connected to the plurality of first connecting members, through the forth connecting member.

Patent reference 1 is Japan Patent Published Application No. H09-326571.

Patent reference 2 is Japan Patent Published Application No. 2000-118619.

Patent reference 3 is Japan Patent Published Application No. 2003-25850.

Patent reference 4 is Japan Patent Published No. 2002-542753.

SUMMARY OF THE INVENTION

Objects to be Solved

While a harness wire cover described in Patent Reference 1 is capable of moving in only one direction, a harness wire cover shown in "patent document 4" is capable of moving into at least two directions. Thereby, if the harness wire moves complicatedly in between a fixed unit and a moving unit, the contained wire harness is safely protected from external intervention by the harness wire cover following the complex motion of the moving unit.

However, four kinds of connecting members are required to construct the harness wire cover referred in "patent document 4". Thereby, the harness wire cover has a complex structure, a higher manufacturing cost and a lot more process to be involved. Additionally, excessive twist force will possibly disengage engagement of the pin and the hole.

To overcome the above problem, an object of the present invention is to provide a harness wire cover flexible in 3-dimensional directions, which has a simple structure and a low manufacturing cost, and can be easily built, and prevented from a damage by a twist force, and a harness wiring structure using the harness wire cover.

How to Attain the Object of The Present Invention

In order to attain the object of the present invention, a harness wire cover is structured by connecting a first connecting member and a second connecting member alternatively into one another where the first connecting member and the second connecting member have respectively a first joint for engaging the first and second connecting members rotatably in a circumference direction of the harness wire cover and a second joint for engaging them rotatable in an axial direction of the harness wire cover.

As the structure mentioned above, a plurality of first connecting members and a plurality of second connecting members are formed into a flexible harness wire cover, which can smoothly rotate in the circumference direction of the harness wire cover by the first joint rotating and can bend in the axial direction of the harness wire cover by the second joint rotating to cross axes of the first and second connecting members. By simultaneously rotating in the circumference direction and bending in the axial direction of the harness wire cover, the harness wire cover smoothly flexes in three-dimensional directions.

In the harness wire cover mentioned above, the first joint includes one wall of the first connecting member and the other wall of the second connecting member, which are engaged to each other rotatably between an inner surface of one of the one wall and the other wall and an outer surface of another of the one wall and the other wall along the surfaces, and a first pin arranged at one of the one wall and the other wall, and an oval hole arranged at another of the one wall and the other wall along the circumference direction of the other wall and engaged with the first pin.

As the structure mentioned above, the first and second connecting members rotate in the circumference direction thereof by engaging the first pin movably within a range of a length of the oval hole with the oval hole in the circumference direction of the wall. It is preferred that when engaging the connecting members, either the one wall having the first pin or the other wall having the oval hole is bent to increase the quality of engagement. The rotating angle of the connecting members could be adjusted by changing the length of the oval hole. Preferably, a width of the oval hole is slightly wider than the outer diameter of the first pin.

In the harness wire cover as mentioned above, the second joint portion includes one pair of walls of the first connecting member and the other pair of walls of the second connecting member, and a second pin arranged at the one pair of walls and a hole arranged at the other pair of walls and engaged with the second pin.

As the structure mentioned above, the connecting member is permitted to be bendable in one direction by engaging the second pin with the hole rotatably around the second pin. Preferably, the pair of walls having the second pin or the pair of walls having the hole has flexibility to increase the manufacturability. It is also preferred that the pin and the hole have a round cross-section in order to rotate smoothly.

A harness wiring structure using a harness wire cover is characterized in that a harness wire is wired movably from a fixed unit to a moving unit by using any one of harness wire covers mentioned above.

According to the structure mentioned above, for example, a wire harness for supplying electric power, protected with the harness wire cover, is wired from the main body of a motor vehicle to a sliding door, so as to move the harness wire cover back-and-forth in the motor vehicle in accordance with open/close motion of the sliding door. When the sliding door moves to be apart from the main body, and the sliding door in a full-open condition is positioned in a higher position than a position in a complete close condition, the harness wire cover can follow the three-dimensional movement of the sliding door since the harness wire cover is curved smoothly in the three-dimensional directions.

EFFECT OF THE INVENTION

According to the present invention mentioned above, three dimensional flexibility of the harness wire cover can be given by two connecting members with a simple structure, a low manufacturing cost and a lighter weight. Furthermore, since rotation in the circumference direction of the first joint of each connecting member absorbs an applied twist force, breakage or disengagement of the joint is prevented.

According to the invention mentioned above, the connecting members can be connected easily to each other by inserting the first pin into the oval hole. Additionally, the rotating angle in the circumference direction of the connecting members can be adjusted by changing the length of the oval hole.

According to the invention mentioned above, the connecting members can be connected easily to each other by inserting the second pin into the hole.

According to the invention mentioned above, in the moving unit, such as the sliding door of the motor vehicle, which moves 3-dimensionally, the containing wire harness can be protected from the external interference by the harness wire cover flexing in three-dimensional directions. Thereby, reliability of supplying electric power continuously is improved.

The above and other objects and features of this invention will become more apparent from the following description taken in conjunction with the accompanying drawings.

DETAILED DESCRIPTION OF PREFERRED EMBODIMENTS

A preferred embodiment of the present invention is described with reference to FIGS. 1, 2, and 3.

Figure 1:
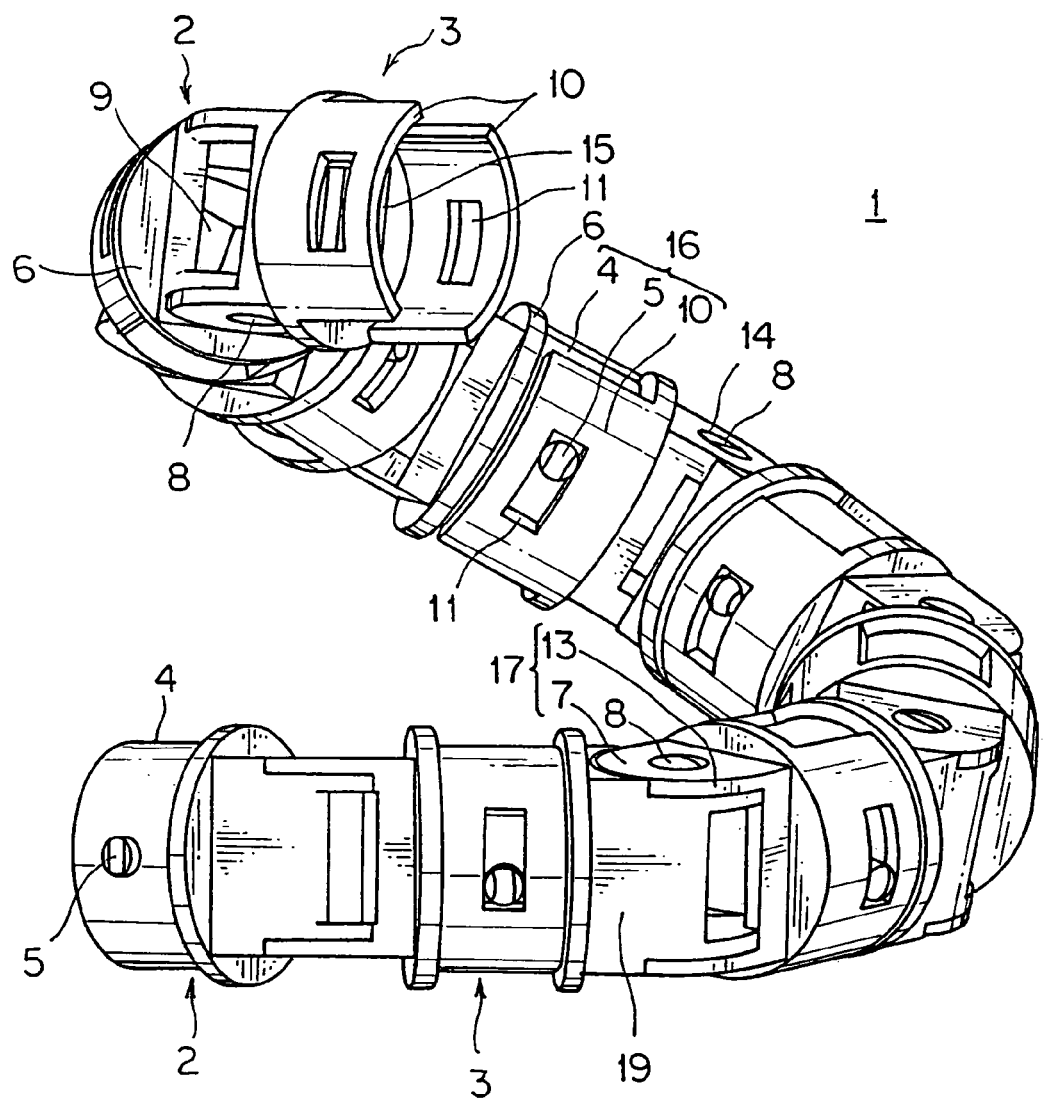
FIG. 1 is a perspective view of one embodiment of a harness wire cover according to the present invention.

As illustrated in FIG. 1, a harness wire cover 1 includes two different connecting members 2, 3 made of synthetic resin. The harness wire cover 1 flexes in three dimensional directions by alternatively engaging the first connecting member 2 to the second connecting member 3.

Figure 2:
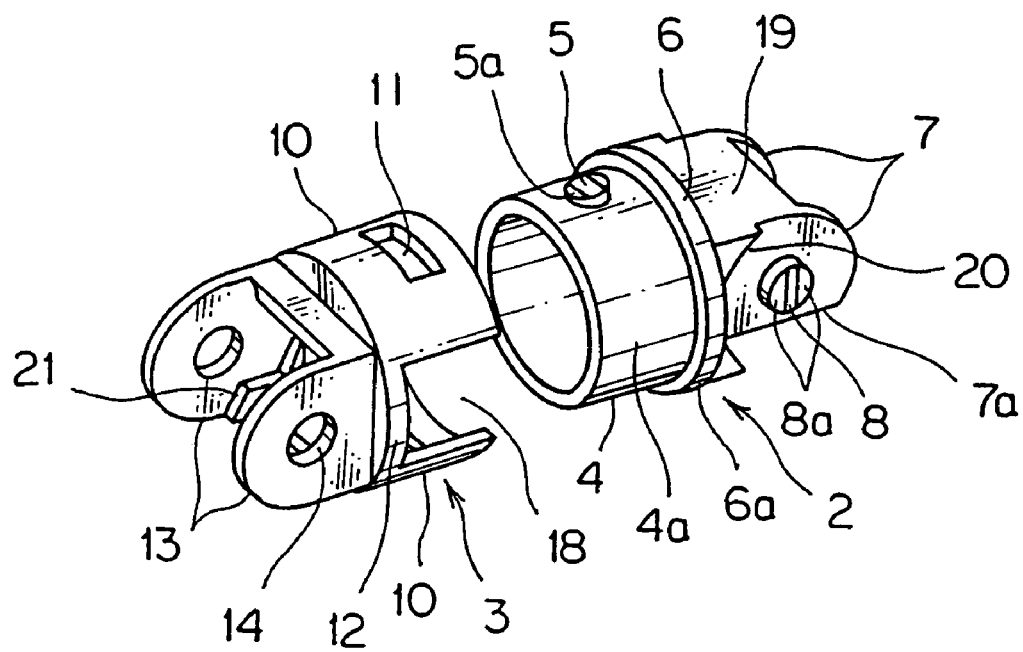
FIG. 2 is an exploded perspective view of two kinds of connecting members structuring the harness wire cover shown in FIG. 1.

As illustrated in FIG. 2, the first connecting member 2 is provided with a cylindrical wall 4, a pair of short cylindrical first pins 5 arranged at an outer surface 4a of the cylindrical wall 4, a doughnut wall 6 arranged at one end of the cylindrical wall 4, a pair of sidewalls 7 correspondingly projecting from the doughnut wall 6, and a pair of short cylindrical second pins 8 arranged at each outer surface of the pair of sidewalls 7.

The first pin 5 and the second pin 8 are arranged perpendicular to each. Wire harness (not-shown electric wires) is inserted through a rectangular hole 9 (FIG. 1) formed in a center of the doughnut wall 6.

The second connecting member 3 includes a pair of arc-shaped walls 10 facing each other and a larger diameter than that of the cylindrical wall 4, a pair of oval holes 11 (rectangular first holes) arranged at the pair of arc-shaped walls 10 along a circumference direction of the arc-shaped wall 10. The outer surface of the two arc-shaped wall 10 is larger in diameter than that of the cylindrical wall 4. A doughnut-shaped wall 12 connecting the pair of arc-shaped walls 10, a pair of sidewalls 13 correspondingly projecting from the doughnut-shaped wall 12 and having an inner width wider than that of the pair of sidewalls 7 of the first connecting member 2 and a pair of round second holes 14 arranged at the pair of sidewalls 13.

The oval hole 11 and the round hole 14 are arranged perpendicular to each. The wire harness (not shown) is inserted through a rectangular hole 15 (FIG. 1) arranged in the center of the doughnut-shaped wall 12.

The first joint 16 (FIG. 3) is structured by the cylindrical wall 4 having the pair of first pins 5 and the pair of arc-shaped walls 10 with the oval hole 11. The second joint 17 (FIG. 3) is structured by the pair of sidewalls 7 with the second pin 8 and the pair of sidewalls 13 with the hole 14.

While inserting the cylindrical wall 4 of the first connecting member 2 into the pair of arc-shaped walls 10 of the second connecting member 3, the first pin 5 is inserted into the oval hole 11 so as to move freely in a lengthwise direction of the oval hole 11. While the pair of walls 7 of the first connecting member 2 (FIGS. 2, 3), which is arranged at a side of the pair of walls 13 of the second connecting member 3 as shown in FIG. 2, is inserted between the pair of walls 13 of the second connecting member 3, the second pins 8 are engaged rotatably around the second pins 8 with the round holes 14.

The second pin 8 is larger in outer diameter than the first pin 5. An inner diameter of the round hole 14 is designed to engage to the second pin 8 without rattling. An inner width of the oval hole 11 is designed to engage to the first pin 5 without rattling. The length of the oval hole 11 is designed larger than the outer diameter of the first pin 5 but within the peripheral length of the arc-shaped wall 10, accordingly to the desired rotating angle. The lengthwise of the long hole 11 corresponds to the circumference direction of the arc-shaped wall 10.

In between the pair of arc-shaped walls 10, a rectangular slit 18 is arranged for enabling the arc-shaped walls 10 to bend in each direction of thickness of the arc-shaped walls 10. By bending the arc-shaped wall 10 outwardly, the first pin 5 and the oval hole 11 can be engaged easily. At each end of the pins 5, 8, a tapered guide surface 5a, 8a is formed to taper toward a direction of inserting into each hole 11, 14 for easily inserting each pin into the respective holes 11, 14. The doughnut wall 6 of the first connecting member 2 has a flange 6a, a diameter of which is larger than a diameter of the cylindrical wall 4. Top ends of the pair of arc-shaped walls 10 of the second connecting member 3 can approach or abut on the flange member 6a.

A short wall 19 is connected to each top side in FIG. 2 of the pair of sidewalls 7 of the first connecting member 2 to have suitable rigidity. The pair of sidewalls 13 of the second connecting member 3 is bendable in the direction of thickness thereof. At each base of the pair of sidewalls 7 of the first connecting member 2, an arc-shaped step 20 is arranged and has a surface to approach or abut slidingly on the each top end of the pair of sidewalls 13 of the second connecting member 3.

In the embodiment shown in FIG. 2, each bottom side in FIG. 2 of the pair of sidewalls 7 of the first connecting member 2 is cut out in a straight line (a cutout 7a), and at the each bottom side of the pair of sidewall 13 of the second connecting member 3, a step 21 is arranged. The cutout 7a abuts on the step 21 thereby the first connecting member 2 is limited to rotate over the step 21 about the second connecting member 3. By removing the cutout 7a and the step 21, the first and second connecting members 2, 3 can move without a limit range of rotating angle.

Figure 3:
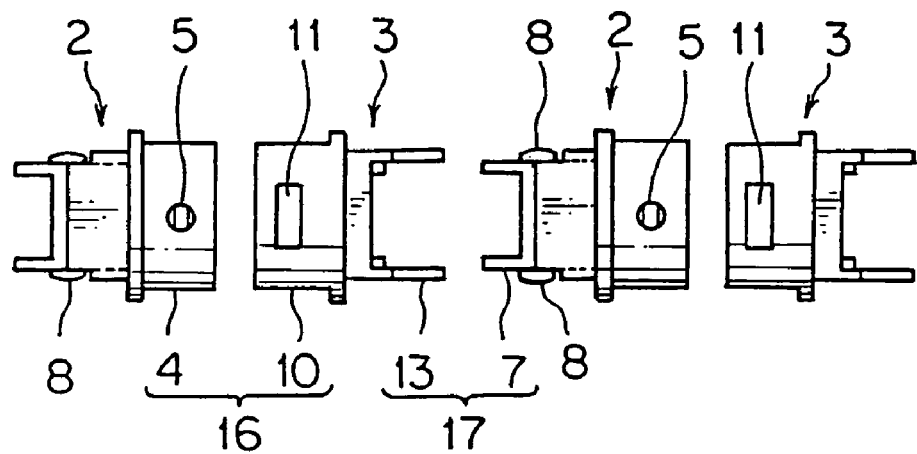
FIG. 3 is a plan view of two kinds of connecting members shown in FIG. 1 arranged in a direction to be assembled.

As shown in FIG. 3, the first connecting member 2 and the second connecting member 3 are alternatively connected in a direction of axes thereof to each other into the harness wire cover 1 as illustrated in FIG. 1. In other words, the cylindrical wall 4 of the first connecting member 2 is inserted in an axial direction thereof between the pair of arc-shaped walls 10 of the second linking member 3 on the right side of the first connecting member 2 in FIG. 3 so as to engage the first pin 5 to the oval hole 11 (first joint 16). And the pair of sidewalls 13 of the second connecting member 3 is inserted between the pair of the sidewalls 7 of the first linking member 2 on the right side of the second connecting member 3 so as to engage the second pin 8 to the hole 14 (second joint 17). By connecting the connecting members alternatively in this manner, the harness wire cover 1 is assembled in a required length.

As FIG. 1 illustrates, the harness wire cover 1 is flexible in three-dimensional directions. By engaging the second pin 8 to the circular hole 14, the connecting members 2, 3 are enabled to rotate freely in one direction to cross axes thereof, and by engaging the first pin 5 to the oval hole 11, the connecting members 2, 3 are enabled to rotate freely in the circumference direction thereof. Thereby, the connecting members 2, 3 can rotate in the circumference direction and around the second pin 8, so that the harness wire cover 1 can move in three-dimensional directions. In this way, the harness wire cover 1 with a simple structure by using two kinds of connecting members 2, 3 can freely move smoothly in the three-dimensional directions.

Figure 4:
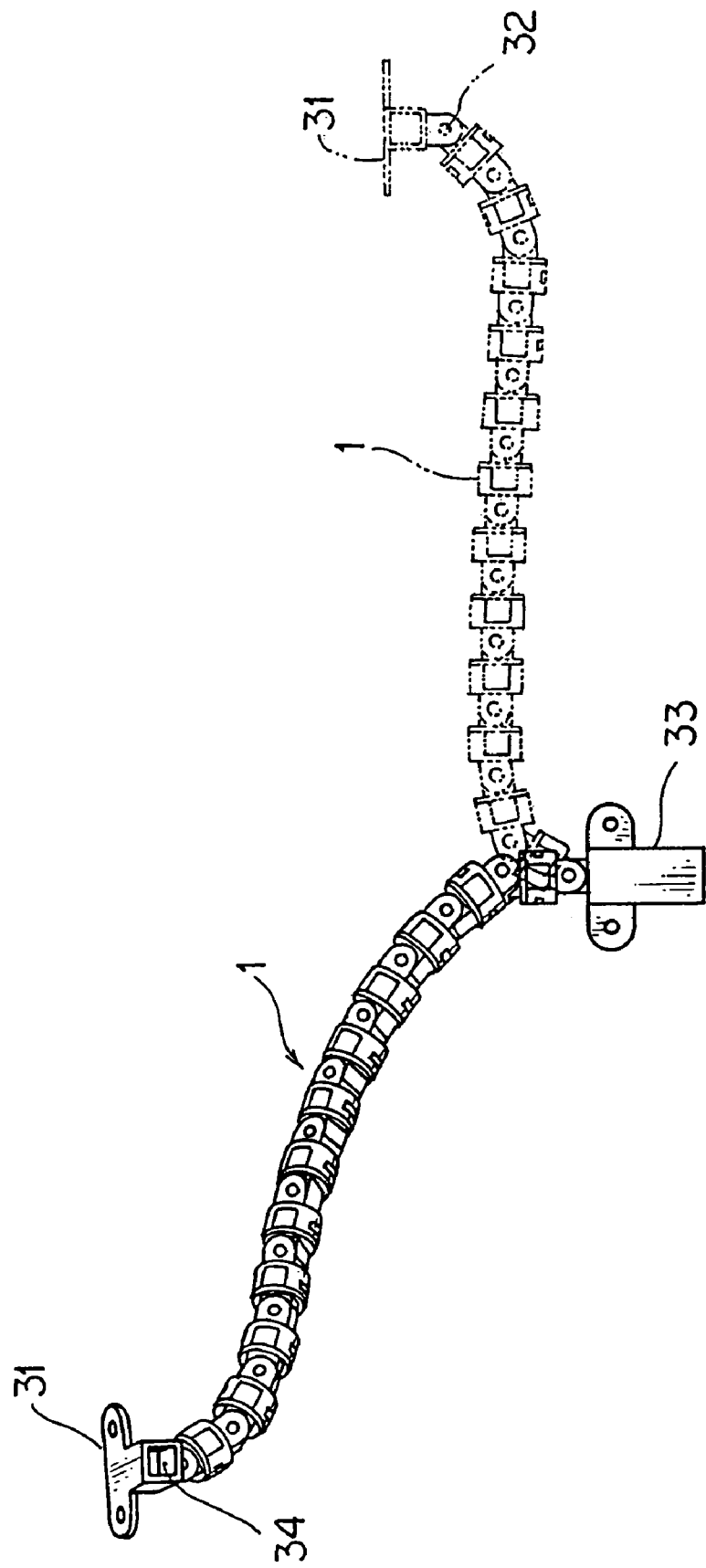
FIG. 4 is a plan view of an embodiment of a harness wiring structure by using the harness wire cover shown in FIG. 1.
Figure 5:
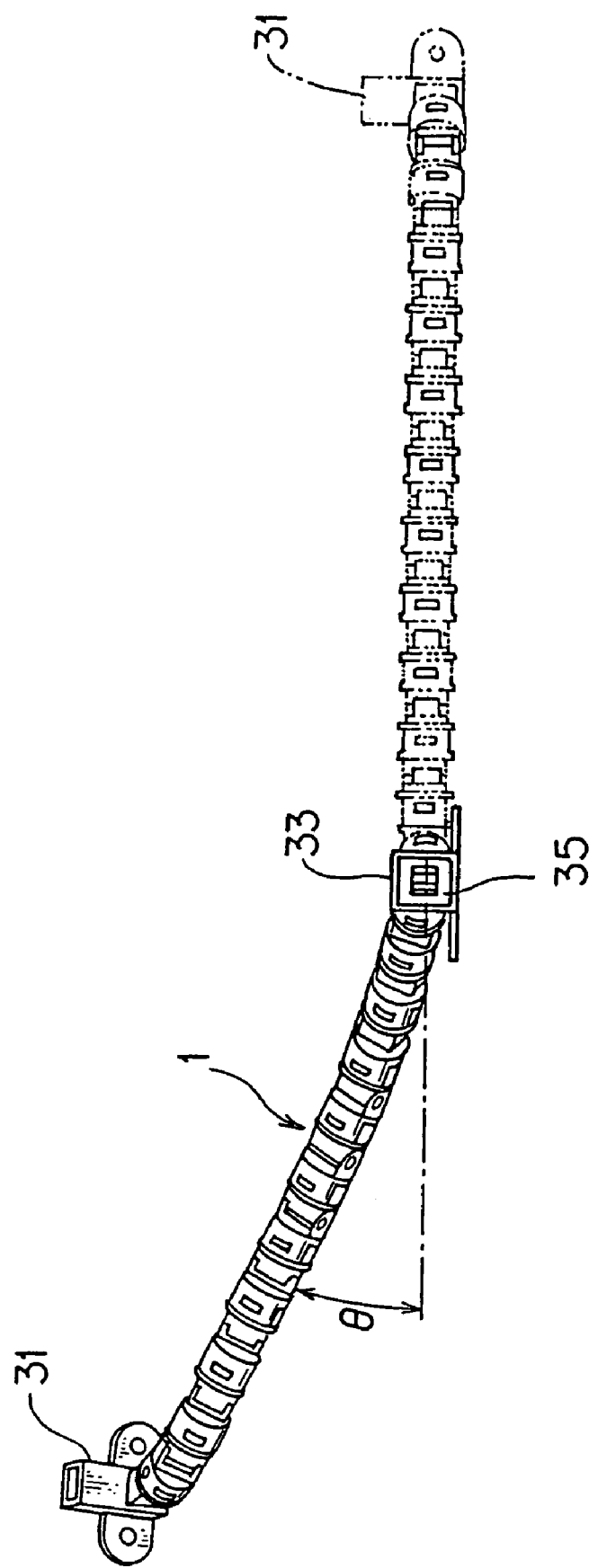
FIG. 5 is a side view of the harness wiring structure shown in FIG. 4.
Figure 6:
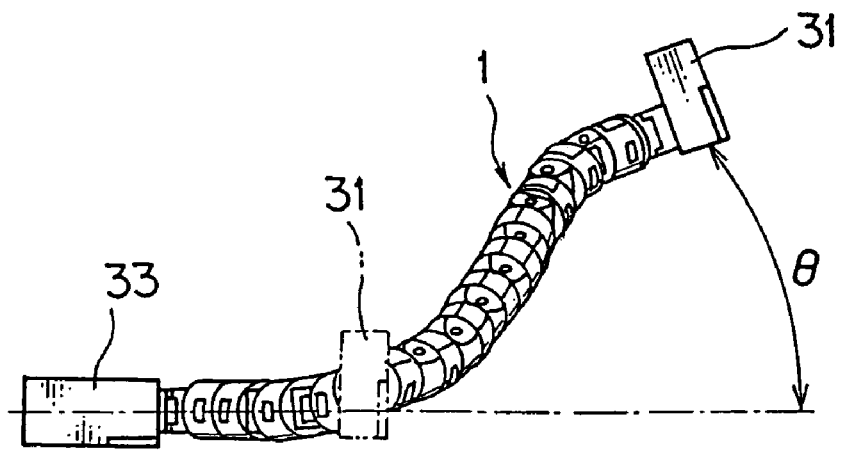
FIG. 6 is a front view of the harness wiring structure shown in FIG. 4.
Figure 7:
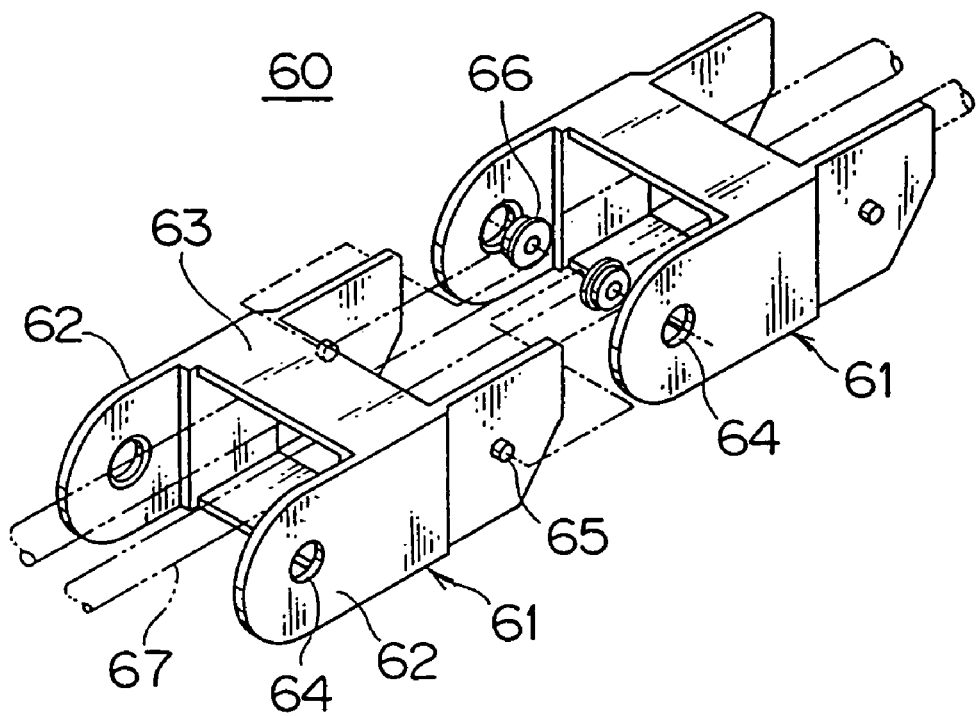
FIG. 7 is an exploded perspective view of an example of a harness wire cover by prior art.
Figure 8:
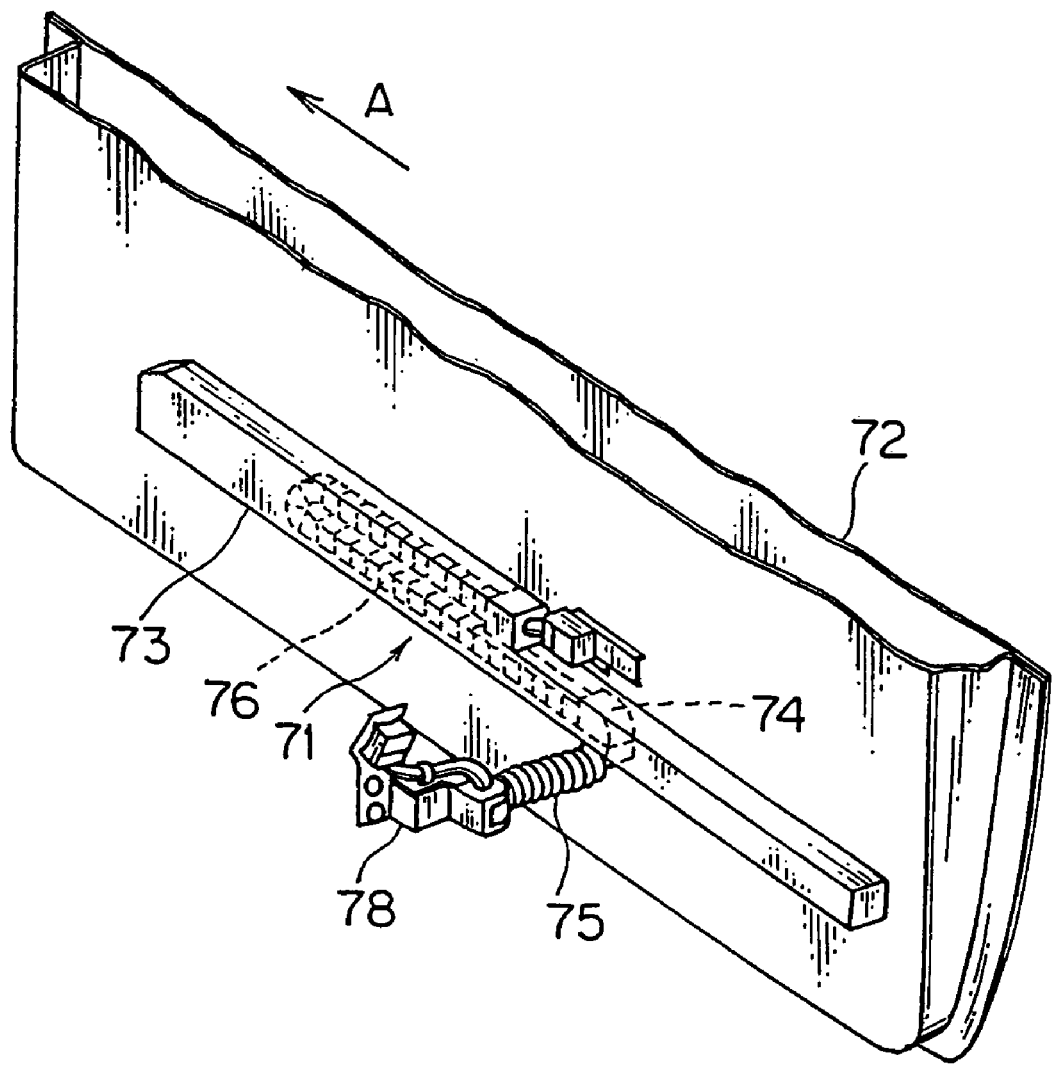
FIG. 8 is a perspective view of an example of a harness wiring structure by using the harness wire cover by prior art.

The wire harness is inserted through the harness wire cover 1 after the harness wire cover 1 is assembled. Nevertheless, it is also possible to insert the wire harness before assembling the harness wire cover 1. In both cases, the wire harness is inserted from a space between the pair of sidewalls 7 of the first connecting member 2, through the center hole 9 of the doughnut wall 6, to a space of the cylindrical wall 4, then through the center hole 15 of the doughnut wall 12 of the second connecting member 3, to a space between the pair of sidewalls 13. It is also possible to insert the wire harness in an opposite direction FIGS. 4-6 illustrate the harness wire cover 1 applied into a harness wiring structure of a sliding door of a motor vehicle (not shown). In FIGS. 4-6, the full lines illustrate the harness wire cover 1 in a condition in which the sliding door is fully opened, and long dashed double-short dashed lines illustrate the harness wire cover 1 in a condition in which the sliding door is completely closed. FIG. 4 is a plan view of the harness wire cover. FIG. 5 is a side view of the harness wire cover. FIG. 6 is a front view of the harness wire cover.

One end of the harness wire cover 1 is attached to a bracket 31 to be fixed on the sliding door by engaging the pin 8 to the hole 32, and the other end thereof is attached to a fixture 33 to be fixed on the main body of the vehicle similarly.

An exposed wire harness is inserted through the harness wire cover 1. One end of the wire harness is led through the hole 34 of the bracket 31 to the sliding door and the other end thereof is led through the hole 35 of the fixture 33 to the main body of the vehicle. It is also possible to connect the harness wire of the sliding door and the wire harness in the harness wire cover 1 by connectors instead of the bracket 31.

The figures illustrate that the sliding door is closed forwardly and opened backwardly. The sliding door moves along a guiding rail (not shown) of the vehicle and outwardly apart from the main body just after starting to be opened so as to be positioned higher than a position to be completely closed, and to make a bottom side of the sliding door apart from the main body more than a top side of the sliding door. Thereby, the door tilts when opening.

The harness wire cover 1 moves in three-dimensional directions according to such three-dimensional motion of the sliding door for protecting the containing wire harness between the main body and the sliding door from external intervention.

As illustrated with the long dashed double-short dashed line in FIG. 4, when the sliding door is completely closed, the harness wire cover 1 is curved inwardly with a small radius at a near position from the bracket 31, and curved outwardly with a small radius at a near area of the fixture 33. As shown with the long dashed double-short dashed line in FIGS. 5-6, the other area of the harness wire cover 1 extends horizontally along a straight.

As illustrated with the full line in FIG. 4, when the sliding door is fully opened, the harness wire cover 1 is twisted in the circumference direction in a middle area on the length thereof, generally in an S-shaped manner, and flexed inwardly at the near position from the bracket 31. As shown with the full line in FIG. 5-6, the harness wire cover 1 is tilted (tilt angle θ), so that the bracket 31 is positioned higher than the fixture 33. Corresponding opening/closing the sliding door, the harness wire cover 1 and the internal harness wire move together in a front/rear direction of the vehicle in between the bracket 31 and the fixture 33.

The bracket 31 could be fixed on an inner panel of the sliding door.

The above mentioned embodiment has used the first connecting member 2 including the cylindrical wall 4 with the first pin 5 arranged at the outer surface of the cylindrical wall 4 and the second connecting member 3 including the arc-shaped wall 10 with the oval hole 11. Oppositely, it is also possible to use the first connecting member including the cylindrical wall 4 with the oval hole 11 and the second connecting member 3 including the arc-shaped wall 10 with the first pin 5 on an inner surface thereof. Instead of the oval hole 11, a groove could also be used.

It is also possible to replace the cylindrical wall 4 of the first connecting member 2 with a pair of arc-shaped walls corresponding to each other and having rectangular cutouts therebetween, and a first pin 5 or an oval hole 11. It is also possible to make an inner diameter of the cylindrical wall 4 larger than an outer diameter of the pair of arc-shaped wall 10, and arrange the first pin 5 at the inner surface instead of the outer surface of the cylindrical wall 4.

The above mentioned embodiment has the first pin 5 and the second pin 8 perpendicular to each other. However, the place of the first pin 5 is not limited to the mentioned position. For an instance, the first pin 5 can be arranged in parallel to the second pin 8, and the pair of arc-shaped walls 10 and the pair of sidewalls 13 should be placed in parallel to each other accordingly. Thus, the first and the second connecting members 2, 3, must be engaged rotatably in the circumference direction to each other. The first pin 5 could have a rectangular cross-section.

The above mentioned embodiment uses the first connecting member 2 having the pair of sidewalls 7 with the second pin 8 arranged on an outer surface of the sidewall 7, and the second connecting member 3 having the pair of sidewalls 13 with the round hole 14 bored on the sidewalls 13. However, it is possible to arrange the round hole 14 at the pair of the sidewalls 7 of the first connecting member 2, and the second pin 8 on each inner surface of the pair of sidewalls 13 of the second connecting member 3. Likewise, a connecting structure with pins 5, 8 and holes 11, 14 could be designed accordingly to the requirement.

The cylindrical wall 4 of the first connecting member 2 should have an outer surface with a round cross-section. However, the cylindrical wall 4 can have the inner cavity with any cross-sectional shape, such as a round or a rectangular cross section, through which can pass the wire harness safely. Similarly, the pair of arc-shaped walls 10 of the second connecting member 3 should have an inner surface with a round cross section, but can have any outer surface, such as with a round or a rectangular cross section, which can rotate in the circumference direction without intervention.

A harness wiring structure by using the harness wire cover 1 in FIGS. 4-6 is applied to an electric power apparatus for a sliding door of a vehicle. The harness wiring structure by using the harness wire cover can be applied to any kind of a sliding door or a sliding unit of a machinery or an apparatus. The sliding door corresponds to the sliding unit, and the main body of the vehicle, or the main body of the machinery, or the main body of an apparatus corresponds to the fixed unit.

The harness wiring structure by using the harness wire cover 1 could also be applied to any moving unit, with a three-dimensional movement other than the sliding structure. As FIG. 1 shows, it could also be applied to any moving unit of machinery or an apparatus, in which the harness wire cover formed into a spiral shape is moved.

What is claimed:

1. A harness wire cover comprising:
a first connecting member;
a second connecting member, having a pair of arc shaped walls with slits therein and oval holes arranged along a circumferential direction of each arc shaped wall, and a pair of projecting walls with holes therein, connected with the first connecting member alternately each other,
wherein the first connecting member and the second connecting member have respectively a first joint for engaging the first and second connecting members rotatably with respect to each other in a circumference direction of the harness wire cover and a second joint for engaging the first and second connecting members rotatably in an axis direction of the harness wire cover.

2. The harness wire cover as claimed in claim 1, wherein the first joint includes one wall of the first connecting member and the other wall of the second connecting member, which are engaged to each other rotatably between an inner surface of one of the one wall and the other wall and an outer surface of another of the one wall and the other wall, and a first pin arranged at one of the one wall and the other wall, with the oval hole arranged at another of the one wall and the other wall along the circumference direction of the wall and engaged with the first pin.

3. The harness wire cover as claimed in claim 2, wherein the second joint includes one pair of walls of the first connecting member and the other pair of walls of the second connecting member, and a second pin arranged at one of the one pair of walls and the other pair of walls with the hole arranged at another of the one pair of walls and the other pair of walls and engaged with the second pin.

4. A harness wiring structure, comprising:
 a wire harness; and
 a harness wire cover claimed in claim 3,
 wherein the harness wire is wired movably from a fixed unit to a moving unit by using the harness wire covers.

5. The harness wire cover as claimed in claim 1, wherein the second joint includes one pair of walls of the first connecting member and the other pair of walls of the second connecting member, and a second pin arranged at one of the one pair of walls and the other pair of walls with the hole arranged at another of the one pair of walls and the other pair of walls and engaged with the second pin.

* * * * *